United States Patent

Lowe

[11] Patent Number: 5,865,882
[45] Date of Patent: Feb. 2, 1999

[54] VOC-FREE PROTECTIVE COATING

[75] Inventor: Darren E. Lowe, Marrero, La.

[73] Assignee: Molecular Architects, Inc., Kernersville, N.C.

[21] Appl. No.: 866,685

[22] Filed: May 30, 1997

[51] Int. Cl.$^6$ .............................. C09D 5/08; C09D 191/06
[52] U.S. Cl. .................................. 106/14.13; 106/14.14; 106/271
[58] Field of Search .............................. 106/14.13, 14.14, 106/271

[56] References Cited

U.S. PATENT DOCUMENTS

| | | | |
|---|---|---|---|
| 2,215,144 | 9/1940 | Clayton et al. | 106/271 |
| 3,086,871 | 4/1963 | Sheldahl et al. | 106/14.14 |
| 3,497,365 | 2/1970 | Afherton et al. | 106/8 |
| 4,317,755 | 3/1982 | Gregory | 524/276 |
| 4,347,333 | 8/1982 | Lohr et al. | 524/269 |
| 4,565,644 | 1/1986 | Smith et al. | 252/92 |
| 4,851,043 | 7/1989 | Dotson et al. | 106/14.11 |
| 4,942,193 | 7/1990 | Van Buskirk et al. | 524/276 |
| 4,990,184 | 2/1991 | Dotson et al. | 106/14.11 |
| 5,049,186 | 9/1991 | Kawabata | 106/2 |
| 5,389,129 | 2/1995 | Jordan | 106/271 |
| 5,494,593 | 2/1996 | Schleusener | 252/8.6 |

FOREIGN PATENT DOCUMENTS 56-129262  10/1981  Japan ..................... 106/271

*Primary Examiner*—David Brunsman
*Attorney, Agent, or Firm*—Heslin & Rothenberg, P.C.

[57] ABSTRACT

A formable, weldable, VOC-free protective coating for use on a number of substrates including metal, wood, concrete, plastic, pipe and transportation equipment. The composition includes beeswax, ammonia, water and, optionally, paraffin. It may also include fillers, dyes, pigments and corrosion inhibitors, but does not require surfactants or stabilizers. The composition is particularly useful for protecting steel prior to welding. It can be removed without organic solvents.

17 Claims, No Drawings

VOC-FREE PROTECTIVE COATING

FIELD OF THE INVENTION

The present invention relates to a stable water-based beeswax emulsion formulation free of volatile organic compounds (VOCs) and useful as a hard surface protective coating. Specifically, the present invention is concerned with a water-based protective composition which can be applied to the surfaces of wood, steel, concrete, pipe, plastic, transportation equipment and marine equipment and vessels.

BACKGROUND OF THE INVENTION

Wax-containing compositions for the protection of various surfaces including automobiles, agricultural vehicles and construction equipment are known. Among these, wax-solvent dispersions are widely used. More recently, water-based compositions have been described. These contain wax modifiers, coalescent film-forming agents to assist processing of the wax components, anionic, cationic and amphoteric surfactants to stabilize oil-in-water emulsions and various additives to improve the hardness and durability of the coating once applied to the surface to be protected.

Problems with protective coating for metals, especially those primarily intended for long-term storage protection, have always existed. Prominent difficulties have been tackiness, poor water removability, sensitivity to water, objectionable odor, and where water-borne compositions are involved, limited high-temperature storage stability of the compositions themselves. In addition, the solvent-containing protective compositions require substantial evaporation of their solvents for the formation of wax barrier coats. Drawbacks of such solvent-type protective compositions include the health, safety and environmental concerns associated with the vapor emissions from the solvents used.

The limitations of conventional solvent-containing coating preparations are best illustrated in the marine industry where their use produces dangerous conditions for applicators and welders in the void and tank areas of ships and barges. Accumulation of vapors in these areas can cause sudden explosions. During welding, the risk of flash fires is high.

The more recent formulations, which have eliminated solvents from the composition, still rely on the use of wax modifiers, surfactants and film forming agents to maintain the desired characteristics of durability and uniform coating properties. Wax modifiers such as naphthenic or paraffinic oils require that the right proportions be used to avoid a coating which will either flow off (melt) if the amount is too large or become too brittle if the amount is too little. Film forming properties are also imparted with film coalescing agents like mineral spirits and ethylene glycol monopropyl ether.

SUMMARY OF THE INVENTION

It is an object of the present invention, therefore, to provide a simple, environmentally safe coating material free of the deleterious effects of solvent emissions while retaining the durability of conventional solvent containing formulations without the need for extraneous additives.

An additional object of the present invention is to provide a water-based, coating preparation free of solvents, wax modifiers, surfactants and the like which is nonetheless easy to apply, can protect coated surfaces from corrosion under the types of austere environmental conditions likely to be encountered in the marine industry, yet is easily removed. By "easily removed" is meant for purposes of this invention removal with soap and hot water.

The composition of the invention is suitable for application by spraying or by "dip coating". The composition provides both salt spray (ASTM B-117 corrosion test) and humidity protection (ASTM D-2247).

In its most basic aspect, the invention relates to a water-based, VOC-free wax emulsion composition for use as a protective coating on hard surfaces comprising the following four elements:

(a) 5–80 parts, preferably 15–30 parts by volume beeswax;
(b) 0–6 parts by volume paraffin wax;
(c) 1–3 parts by volume ammonia
(d) 150–175 parts by volume water.

In another aspect, the invention relates to the method for protecting hard surfaces comprising:

a) applying the foregoing composition to a surface; and
b) allowing water to evaporate to leave behind a VOC-free protective coating on the surface. The coating may be removed by exposure to water and a soap or detergent at 50°–100° C.

DETAILED DESCRIPTION OF THE INVENTION

The present invention relates to a water-based, VOC-free wax emulsion comprising, the following four elements: beeswax, paraffin wax, ammonia, and water. Additionally, the composition may comprise one or more fillers, dyes, pigments, and corrosion inhibitors. These may be added in amounts, readily determined by routine experimentation, that do not render the emulsion unsuited for its intended purpose.

Waxes

An essential component of the formulation of the present invention is beeswax. Beeswax consists of esters of straight-chain monohydric alcohols with even-numbered carbon chains from $C_{24}$ to $C_{36}$ esterified with straight-chain acids also having even numbers of C atoms up to $C_{36}$ (some $C_{18}$ hydroxyacids). Examples of such esters are triacontanol hexadecanoate and hexacosanol hexacosanoate. These esters are mixed with about 20% (w/w) of hydrocarbons having odd-numbered straight carbon chains from $C_{21}$ to $C_{33}$. Natural beeswax contains up to about 6% of minor constituents such as propolis and pigments. In the present invention, a portion of the beeswax may be substituted with a beeswax equivalent. A beeswax equivalent is a mixture of straight-chain alcohol esters of straight-chain acids, optionally including hydrocarbons. Commercially available beeswax substitutes include SYNCHROWAX BB4 (Croda, Inc.), VYBAR (Petrolite Corp.) and a basic blend available from Koster Keunen, Inc.

Another wax which may be used in addition to the beeswax is a paraffin wax, preferably one which has a melting point of about 135° F. (57.2° C.).

Ammonia

Aqueous ammonia is present in the compositions of the invention in a concentration sufficient to provide a pH of from about 6 to 10.5 or more, preferably 8.5 to 9.5. Ammonia may be conveniently provided in the form of a 28% aqueous solution of ammonium hydroxide.

Fillers

The composition of the present invention may also include a filler. Typical filler materials utilized in these types of compositions include, but are not limited to, the following: aluminum silicate, anhydrous aluminum silicate, calcined aluminum silicate, diatomaceous earth, calcium silicate, silica, alumina, perlite, talc, graphite, metal powders and mixtures thereof.

Pigments and Dyes

Pigments and dyes may be added to the composition to impart a color to or otherwise modify the appearance of the coating preparation. The choice of pigment and/or dye will be based on the desired appearance and compatibility with the beeswax/ammonia emulsion. Pigments and dyes are well known to those skilled in the art and are widely commercially available.

Corrosion Inhibitors

Generally, nitrates, nitrites, amine soaps of fatty acids, and borates can be used. Nitrates include salts or esters of nitric acid such as ammonium nitrate, potassium nitrate, and preferably sodium nitrate. Borates include salts or esters of boric acid such as ammonium borate and sodium borate. However, it is to be noted that not all corrosion inhibitors will yield useful compositions.

Other corrosion inhibitors that may be used, if any, are any sulfonate having a cation selected from the group consisting of: Group Ia and IIa of the periodic table. Preferred salts are sodium, calcium, barium, ammonium, and potassium salts of sulfonates having a molecular weight in the range 300–600.

Anti-Micobial Agents

If desired, antimicrobial agents may be employed in conventional amounts (0.1%) to prevent undesired haze or odors from developing in the compositions upon prolonged storage and to otherwise ensure biological stability.

The preferred formulation for the protective coating of the present invention is as follows.

EXAMPLE A--PREPARATION OF EMULSION

The formula given is for a 100 gallon batch of emulsion.

| component gallons | pounds |
|---|---|
| water 83.57 | 696.53 |
| beeswax 14.02 | 112.33 |
| paraffin 1.67 wax-135 | 12.54 |
| ammonia (28%) 0.74 | 5.51 |

A mixing tank is charged with water, beeswax (Koster Keunen Ross Waxes) and PW-135. The mixture is agitated at slow speed while heating to 145° F. (62.8°C.) and held at that temperature until all the wax has melted. When the wax has melted and been dispersed, the ammonia is slowly added. It may be necessary to increase agitation of the mixture at this time to maintain a good vortex. The mixture is allowed to cool to room temperature either by quenching or gradual cooling. Once the mixture has reached room temperature, it is scraped from the sides and bottom of the mixing tank and the pH is adjusted to 8.5–9.5 with ammonia. The emulsion is then filtered through an extra fine gauge nylon bag into a storage container.

Application of the composition of the present invention to a surface to be protected may be accomplished by spraying, dipping or flowcoating. Those skilled in the art will recognize that spraying and "dip coating" are conventional methods of applying protective coatings.

The ability of the present invention to inhibit corrosion on metal surfaces was tested in the following manner. The sealing preparation was applied to several cold rolled steel Q-panels using conventional spray equipment. After application, the panels were allowed to cure for one week before being placed in either a salt fog cabinet, in accordance with ASTM B-117, or a humidity cabinet, in accordance with ASTM D-2247. The panels were evaluated daily for the presence of corrosion in accordance with ASTM D-610. A rating scale of 0 to 10 was used, with 10 representing no rusting and 0 representing rusting of more than 50% of the exposed surface. After 2500 hours, the four panels in the salt fog cabinet and the seven panels in humidity cabinet showed no signs of any rusting and were given a rating of 10.

While the invention has been particularly shown and described with reference to preferred embodiments thereof, it will be understood by those skilled in the art that other changes in form and details may be made therein without departing from the spirit and scope of the invention.

I claim:

1. A VOC-free wax emulsion composition comprising:
   (a) 5–80 parts by volume beeswax;
   (b) 0–6 parts by volume paraffin wax;
   (c) 1–3 parts by volume ammonia
   (d) 150–175 parts by volume water.

2. The composition of claim 1 wherein the paraffin wax has a melting point of 135° F. (57.2° C.).

3. The composition of claim 1 further comprising a filler.

4. The composition of claim 3 wherein said filler is an inorganic filler chosen from the group consisting of aluminum silicate, anhydrous aluminum silicate, calcined aluminum silicate, talc, silica, graphite and diatomaceous earth.

5. The composition of claim 1 further comprising a dye.

6. The composition of claim 1 further comprising a pigment.

7. The composition of claim 1 further comprising a corrosion inhibitor.

8. The composition of claim 7 wherein the corrosion inhibitor is chosen from the group consisting of a salt of a sulfonic acid, ammonium nitrate, potassium nitrate, sodium nitrate, sodium nitrite, ammonium borate, and sodium borate.

9. The composition of claim 1 wherein the portion of beeswax is 15–30 parts by volume.

10. A water-based wax emulsion composition consisting essentially of:
    (a) 5–80 parts by volume beeswax;
    (b) 0–6 parts by volume paraffin wax;
    (c) 1–3 parts by volume ammonia;
    (d) 150–175 parts by volume water.

11. The composition of claim 10 wherein the portion of beeswax is 15–30 parts by volume.

12. A water-based wax emulsion according to claim 10 consisting essentially of:
    (a) about 168 parts by volume water;
    (b) about 28 parts by volume beeswax;
    (c) about 4 parts by volume paraffin;
    (d) about 2 parts by volume ammonia.

13. A method for protecting hard surfaces comprising:
    a) applying a composition according to claim 1 to said surface; and
    b) allowing water to evaporate from said composition, whereby a VOC-free protective coating remains on said surface.

14. A method according to claim 11 wherein said composition is applied by spraying.

15. A method according to claim 11 wherein said composition is applied by dip coating.

16. A method according to claim 11 wherein said surface is steel.

17. A method according to claim 11 comprising the additional step, following step (b) of:

(c) removing said protective coating by exposing said coating to water and a soap or detergent at 50°–100° C.

* * * * *